United States Patent
Yim et al.

(10) Patent No.: US 7,363,441 B2
(45) Date of Patent: *Apr. 22, 2008

(54) PORTABLE STORAGE APPARATUS AND METHOD FOR FREELY CHANGING DATA BUS WIDTH

(75) Inventors: Myoung-kyoon Yim, Seongnam-si (KR); Sang-kil Lee, Suwon-si (KR)

(73) Assignee: Samsung Electronics Co., Ltd., Suwon-Si ( * ) Notice: Subject to any disclaimer, the term of this patent is extended or adjusted under 35 U.S.C. 154(b) by 0 days.

This patent is subject to a terminal disclaimer.

(21) Appl. No.: 11/744,683

(22) Filed: May 4, 2007

(65) Prior Publication Data

US 2007/0288703 A1 Dec. 13, 2007

Related U.S. Application Data

(63) Continuation of application No. 10/866,602, filed on Jun. 12, 2004, now Pat. No. 7,234,031.

(30) Foreign Application Priority Data

Jun. 21, 2003 (KR) ............... 2003-40482

(51) Int. Cl.
*G06F 12/00* (2006.01)
*G06F 13/16* (2006.01)

(52) U.S. Cl. ............... 711/154; 711/115; 710/13; 710/300; 710/307; 235/380

(58) Field of Classification Search ............ 711/115, 711/154; 710/13, 300, 307, 104; 235/380
See application file for complete search history.

(56) References Cited

U.S. PATENT DOCUMENTS 5,341,481 A * 8/1994 Tsukamoto ............... 710/107
5,548,766 A * 8/1996 Kaneko et al. ............ 710/307
5,630,106 A * 5/1997 Ishibashi .................. 345/533

(Continued)

FOREIGN PATENT DOCUMENTS

JP 03-065745 * 3/1991

(Continued)

*Primary Examiner*—Jack Lane
(74) *Attorney, Agent, or Firm*—F. Chau & Associates, LLC.

(57) ABSTRACT

A portable storage apparatus capable of freely changing a data bus width and a method of setting the data bus width of the apparatus are provided, where the portable storage apparatus has at least one command line and a plurality of data lines and includes a non-volatile memory, a command packet decoder, and a control unit such that the non-volatile memory stores data, the command packet decoder receives command packets through a command line and outputs command information by decoding the received command packets, the command packet decoder receives a data transmit command packet or a data request command packet and outputs a write command or a read command, address information, and data bus width information, the control unit performs a control operation in response to the command information and selects all or some of the plurality of data lines in response to the data bus width information and receives or transmits the data through the selected data line, and controls data writing or reading of the non-volatile memory in response to the write command or the read command and the address information, thereby not requiring the data bus width to be set in advance and enabling free adjustment of the data bus width, if necessary.

15 Claims, 7 Drawing Sheets

U.S. PATENT DOCUMENTS

| | | | |
|---|---|---|---|
| 5,764,950 A * | 6/1998 | Ishizaki | 710/307 |
| 6,226,736 B1 * | 5/2001 | Niot | 712/38 |
| 6,820,148 B1 | 11/2004 | Cedar et al. | |
| 6,941,403 B2 | 9/2005 | Cedar et al. | |
| 6,948,016 B2 | 9/2005 | Cedar et al. | |
| 7,177,964 B2 | 2/2007 | Cedar et al. | |

FOREIGN PATENT DOCUMENTS

| | | | |
|---|---|---|---|
| JP | 03-252848 | * | 11/1991 |
| JP | 2001-067303 | * | 3/2001 |
| JP | 2001-256174 | * | 9/2001 |

* cited by examiner

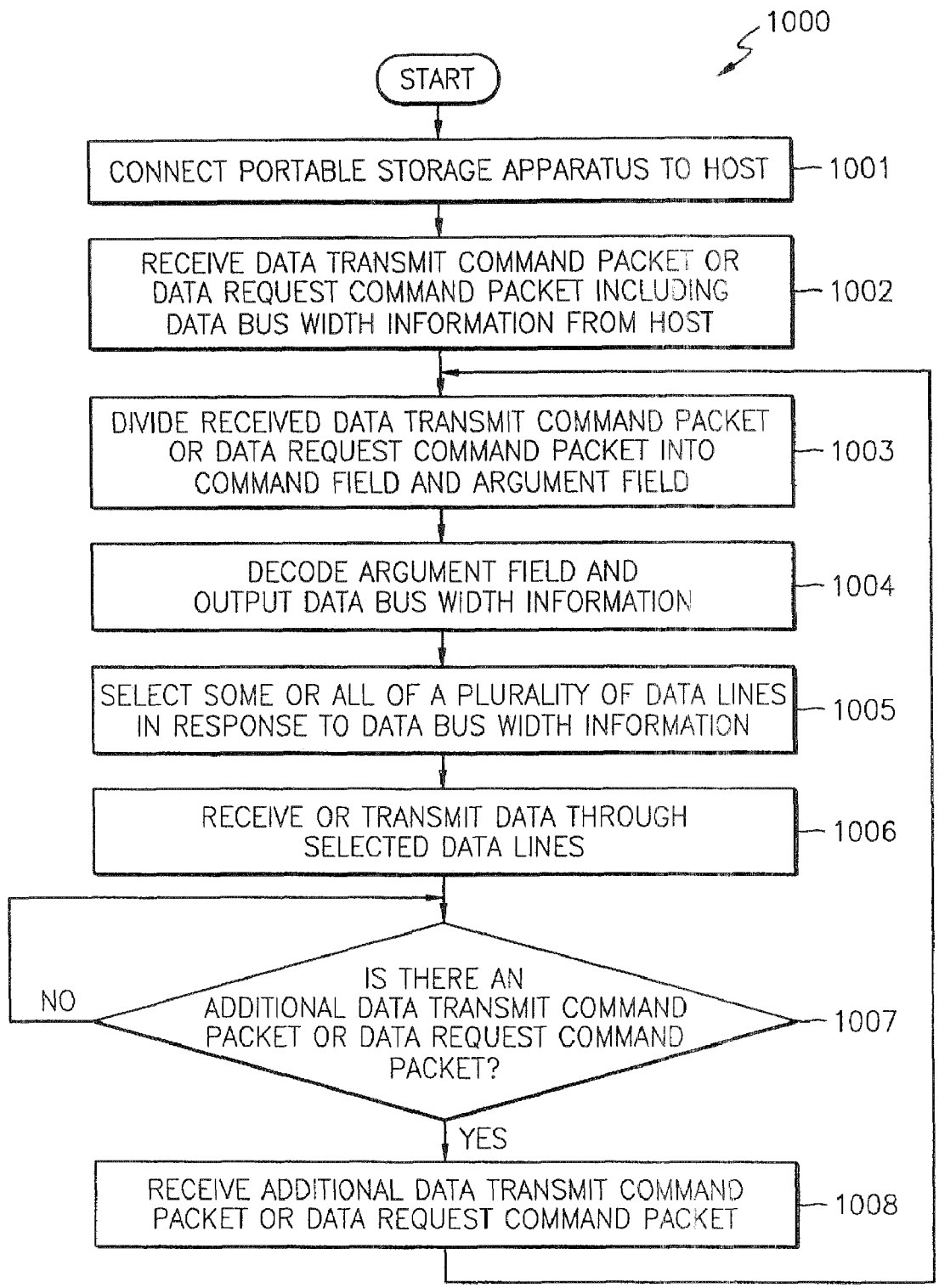

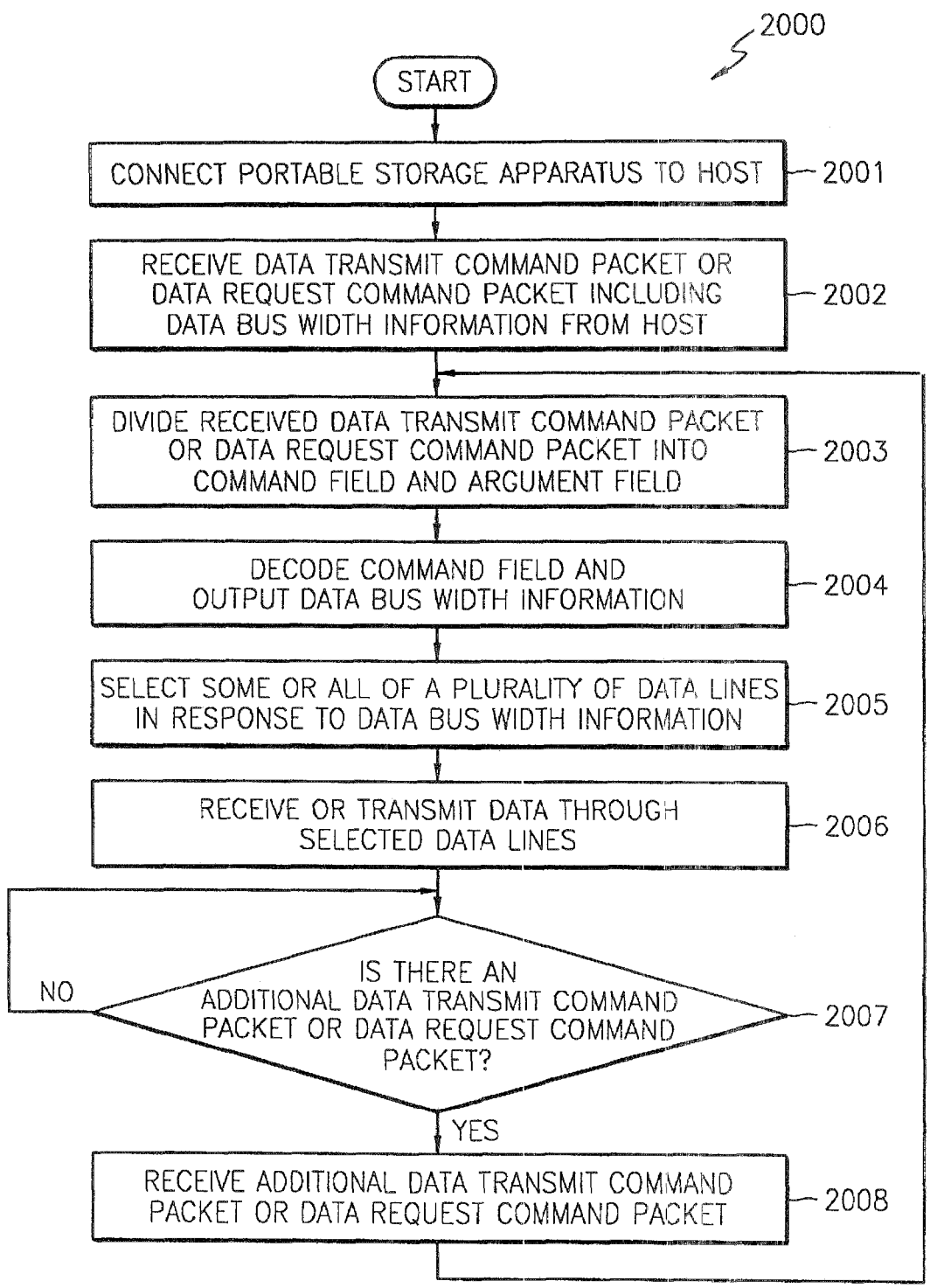

US 7,363,441 B2

PORTABLE STORAGE APPARATUS AND METHOD FOR FREELY CHANGING DATA BUS WIDTH

CROSS-REFERENCE TO RELATED PATENT APPLICATIONS

This application is a continuation of U.S. patent application Ser. No. 10/866,602, filed on Jun. 12, 2004, now U.S. Pat. No. 7,234,031, which claims foreign priority under 35 U.S.C. § 119 to Korean Patent Application No. 2003-40482 filed on Jun. 21, 2003, in the Korean Intellectual Property Office, the disclosures of which are herein incorporated by reference in their entirety.

BACKGROUND OF THE INVENTION

1. Field of the Invention

The present disclosure relates to a portable storage apparatus and method, and more particularly, to a portable storage apparatus and method for changing a data bus width.

2. Description of the Related Art

Generally, a portable storage apparatus is used in a digital apparatus, such as in a camcorder, a digital camera, a personal digital assistant (PDA), an MPEG-1 Layer 3 (MP3) player, and the like. A portable storage apparatus typically includes a MultiMediaCard (MMC), secure digital (SD) memory card, CompactFlash (CF) Card, memory stick, or other storage media. An example of a conventional memory card is disclosed in U.S. Pat. No. 6,446,163.

A portable storage apparatus has multiple data bus widths. The data bus width in the portable storage apparatus is changed in accordance with a current S host to which the apparatus is connected in order to accommodate data communications for hosts having different data bus widths. Thus, a conventional portable storage apparatus includes a predetermined register in which data bus width information is stored. The data bus width in the portable storage apparatus is preset by the host when the portable storage apparatus is connected to the host. Such a conventional portable storage apparatus will be explained with reference to FIG. 1.

FIG. 1 is a block diagram illustrating a conventional portable storage apparatus in signal communication with a host. As shown in FIG. 1, a portable storage apparatus 2 includes a command pin P1 for receiving a command packet, electric power source pins P2 and P3, a clock signaling pin P4, and a plurality of data pins D1 through DN. The command pin P1, the electric power source pins P2 and P3, the clock signaling path P4, and the plurality of data pins D1 through DN are respectively connected to a host 1. In addition, the portable storage apparatus 2 further includes a command packet decoder 30, a control unit 40, a first register 50, a flash memory 60, a data buffer 70, and a second register 80. The command packet decoder 30 includes a packet receiving unit 31, a command field decoder 32, and an argument field decoder 33. The packet receiving unit 31 is connected to the command pin P1 through a command line 10, and the control unit 40 is connected to the data buffer 70 through a plurality of data lines 20.

A process of setting a data bus width in the portable storage apparatus 2 having the above structure will be explained. If the portable storage apparatus 2 is connected to the host 1, the host 1 transmits a command packet CMD_PK for setting the data bus width. The packet receiving unit 31 of the command packet decoder 30 receives a command packet CMD_PK through the command line 10 and divides the received command packet CMD_PK into a command field CMD_FD and an argument field ARG_FD. The command field decoder 32 outputs command information CMD_IF by decoding the command field CMD_FD. The argument field decoder 33 outputs data bus width information BUS_IF by decoding the argument field ARG_FD. The control unit 40 receives the command information CMD_IF and recognizes this information as a command for setting the data bus width. Furthermore, the control unit 40 receives the data bus width information BUS_IF and stores it at a first register 50. Thereafter, the control unit 40 transmits and receives data by selecting all or some of the plurality of data lines 20, based on the data bus width information BUS_IF. Moreover, the command field decoder 32 outputs a write or a read command by decoding the command field CMD_FD when transmitting and receiving general data. The argument field decoder 33 outputs an address signal by decoding the argument field ARG_FD when transmitting and receiving the general data.

Therefore, the data bus width is set before any data bus communication with the host in the conventional portable storage apparatus. This conventional method is only useful for a case where there is no need to change the data bus width for a long period of time, that is, when the portable storage apparatus is connected to only one host. However, if the data bus width is required to change frequently, such as when the portable storage apparatus is connected to several hosts the data bus width is reset in advance whenever the host is changed. Accordingly, the host must separately transmit the command packet for setting the data bus width in advance, and furthermore, the data bus width is reset whenever the host is changed in the conventional portable storage apparatus.

SUMMARY OF THE INVENTION

These and other drawbacks and disadvantages of the prior art are addressed by a portable storage apparatus capable of freely changing a data bus width, and a method of setting the data bus width.

According to an aspect of the present disclosure, there is provided a portable storage apparatus having at least one command line and a plurality of data lines, the apparatus comprising at least one non-volatile memory storing data; a command packet decoder for receiving command packets through the command line and outputting command information by decoding the command packets; and a control unit for performing control operations in response to the command information, wherein the command packet decoder receives one of a data transmit command packet and a data request command packet and outputs one of a write command and a read command, address information, and data bus width information, and wherein the control unit selects all or some of the plurality of data lines in response to the data bus width information and receives or transmits the data through the selected data line, and controls data writing or reading of the non-volatile memory in response to the write command or the read command and the address information.

According to another aspect of the present disclosure, there is provided a method of setting a data bus width in a portable storage apparatus including a command line and a plurality of data lines for connecting to a host, the method comprising: (a) connecting the portable storage apparatus to the host; (b) receiving from the host a command packet comprising at least one of a data transmit command packet and a data request command packet, including the data bus width information; (c) dividing the received command packet into a command field and an argument field; (d)

outputting the data bus width information by decoding the argument field; (e) selecting at least one the plurality of data lines in response to the data bus width information, and passing data through the selected at least one data line selected; and (f) returning to step (c) if an additional data transmit command packet or data request command packet is received.

According to yet another aspect of the present disclosure, there is provided a method of setting a data bus width in a portable storage apparatus including a command line and a plurality of data lines for connecting to a host, the method comprising: (a) connecting the portable storage apparatus to the host; (b) receiving from the host a command packet comprising at least one of a data transmit command packet and a data request command packet, including the data bus width information from the host; (c) dividing the received command packet into a command field and an argument field; (d) outputting the data bus width information by decoding the command field; (e) selecting at least one of the plurality of data lines in response to the data bus width information, and passing data through the selected at least one data line; and (f) returning to step (c) if an additional data transmit command packet or data request command packet is received.

These and other aspects, features and advantages of the present disclosure will become apparent from the following description of exemplary embodiments, which is to be read in connection with the accompanying drawings.

BRIEF DESCRIPTION OF THE DRAWINGS

The above and other features and advantages of the present disclosure will become more apparent by describing in detail exemplary embodiments thereof with reference to the attached drawings, in which:

FIG. 4 is a flow chart illustrating a process of setting a data bus width in a portable storage apparatus shown in FIG. 2;

FIG. 7 is a flow chart illustrating a process of setting a data bus width in a portable storage apparatus shown in FIG. 5.

DETAILED DESCRIPTION OF PREFERRED EMBODIMENTS

Figure 1:
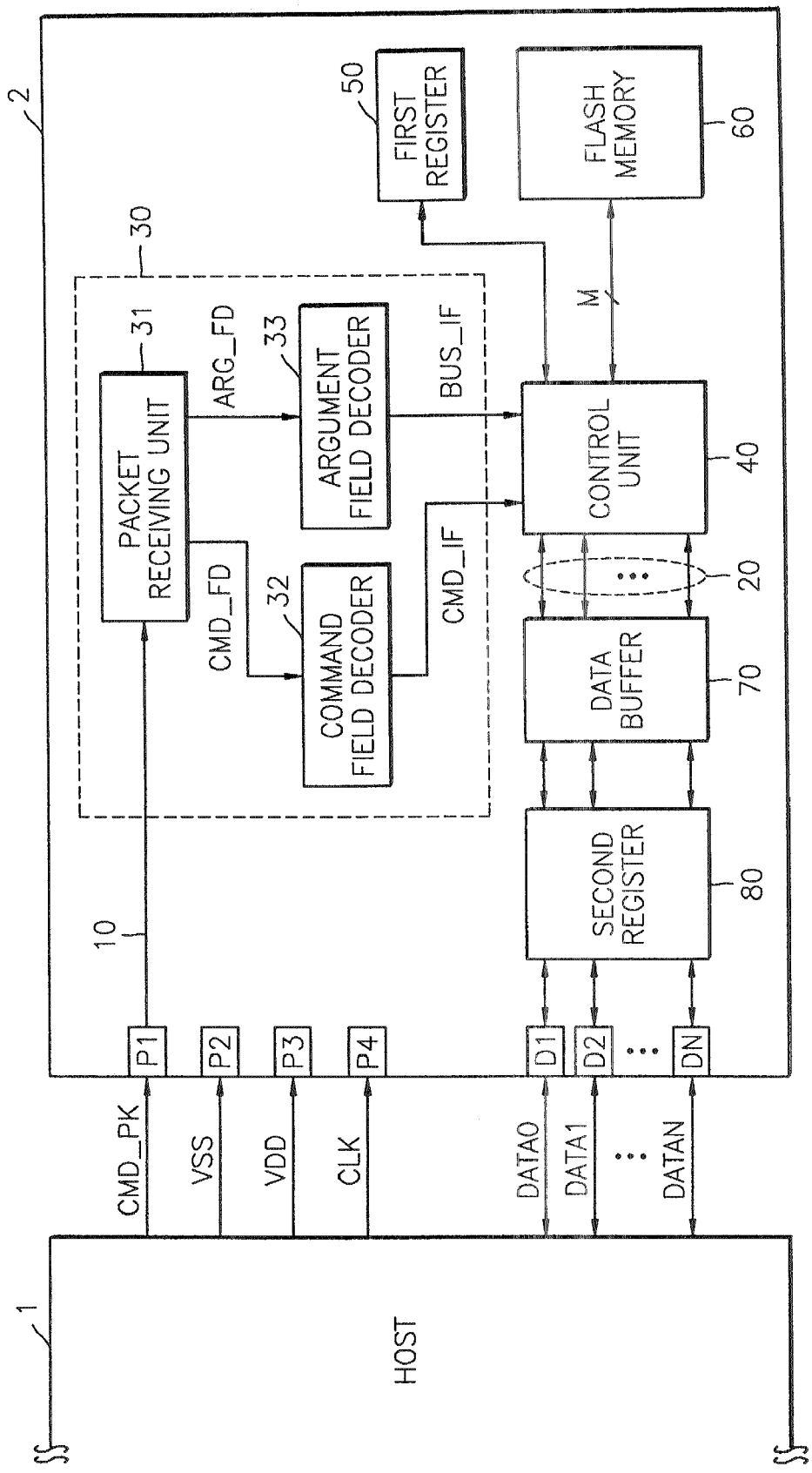
FIG. 1 is a block diagram illustrating a portable storage apparatus and a host according to the prior art.

The present disclosure will now be described more fully with reference to the attached drawings, in which exemplary embodiments thereof are shown. This disclosure may, however, be embodied in many different forms and should not be construed as being limited to the embodiments set forth herein; rather, these embodiments are provided so that this disclosure will be thorough and complete and will fully convey the concept of the disclosure to those skilled in the art. In the drawings, the forms of elements may be exaggerated for clarity. To facilitate understanding, like reference numerals have been used, where possible to designate like elements throughout the figures.

Figure 2:
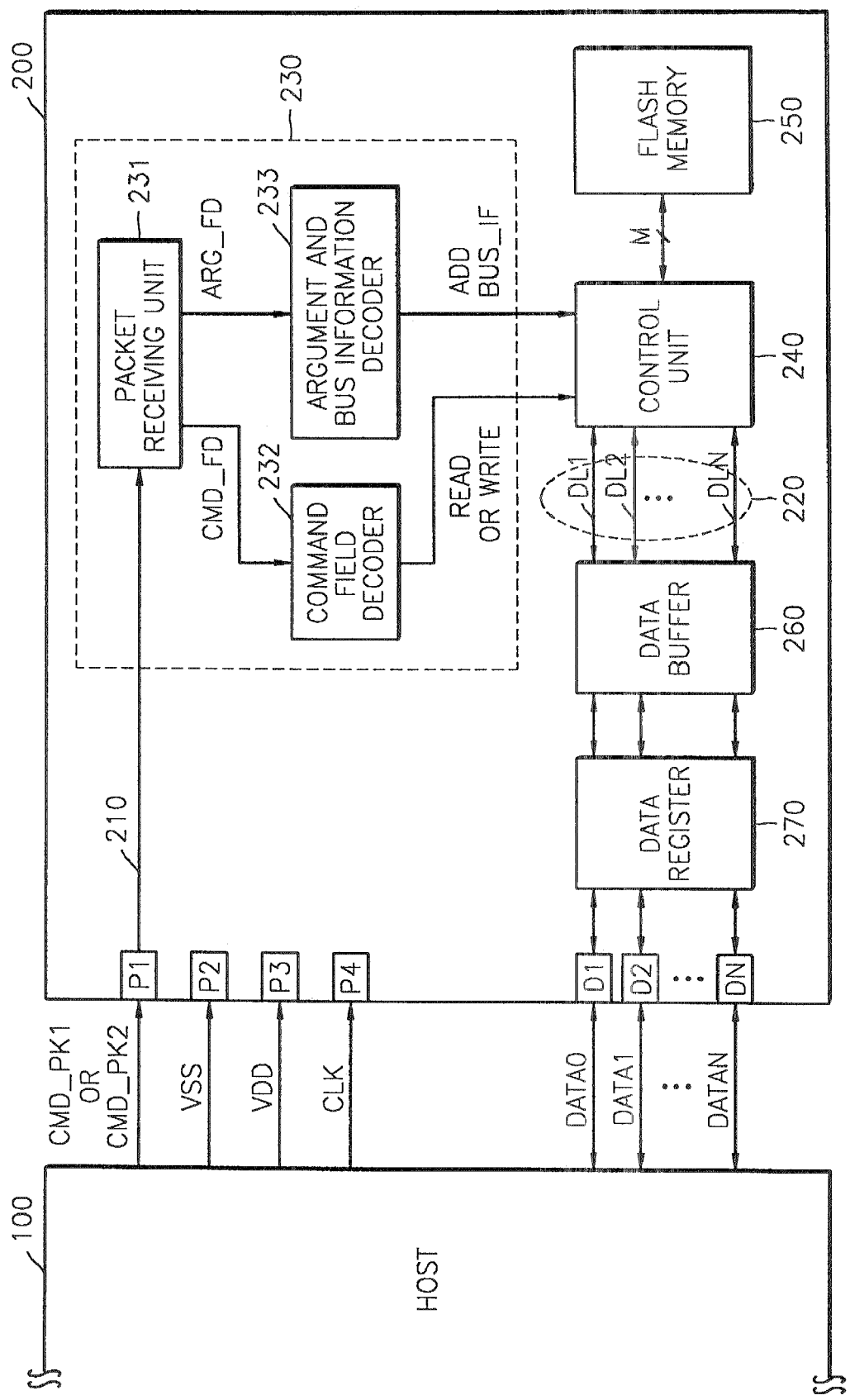
FIG. 2 is a block diagram illustrating a portable storage apparatus capable of freely changing a data bus width according to a first embodiment of the present disclosure.

FIG. 2 is a block diagram illustrating a portable storage apparatus capable of freely changing a data bus width according to a first exemplary embodiment of the present disclosure. Referring to FIG. 2, a portable storage apparatus 200 is in signal communication with a host 100. The portable storage apparatus 200 includes a command line 210, a data line 220, a command packet decoder 230, a control unit 240, a flash memory 250, a data buffer 260, and a data register 270. In addition, the portable storage apparatus 200 further includes a command pin P1, electric power source pins P2 and P3, a clock pin P4, and a plurality of data pins D1 through DN (where N is a natural number greater than 1). The command line 210 is connected to the command pin P1.

The command packet decoder 230 includes a packet receiving unit 231, a command field decoder 232, and an argument and bus information decoder 233. The packet receiving unit 231 receives a data transmit command packet CMD_PK1 or a data request command packet CMD_PK2 from a host 100 through the command line 210, and divides it into a command field CMD_FD and an argument field ARG_FD. The command field decoder 232 outputs a read command READ or a write command WRITE by decoding the command field CMD_FD. The argument and bus information decoder 233 outputs address information ADD and data bus width information BUS_IF by decoding the argument field ARG_FD. Although it is not illustrated in FIG. 2, the command packet decoder 230 further receives various command packets other than the data transmit command packet CMD_PK1 and the data request command packet CMD_PK2 from the host 100. The command packet decoder 230 outputs command information by decoding the various received command packets.

Figure 3A:
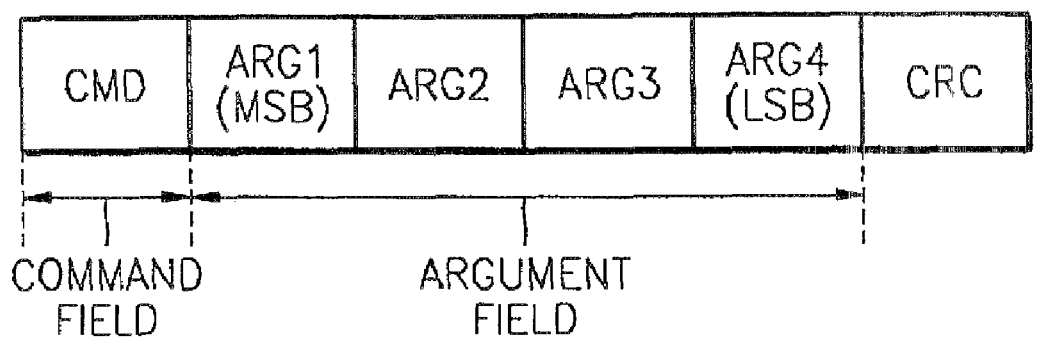
FIG. 3A is a schematic diagram illustrating an example of a data transmit command packet, which a host shown in FIG. 2 sends to a portable storage apparatus.

An example of the data transmit command packet is shown in FIG. 3A. FIG. 3A is a schematic diagram illustrating an example of a data transmit command packet, which a host 100 sends to a portable storage apparatus 200.

The data transmit command packet includes a command field CMD, argument fields ARG1 through ARG4, and a cyclic redundancy checking (CRC) field as shown in FIG. 3A. The command field CMD and the argument fields ARG1 through ARG4 include predetermined bits.

The respective argument fields ARG1 through ARG4 can be formed of eight bits from B7 to B0. In this case, the argument fields ARG1 through ARG4 become 32 bits in total, Some bits among the 32 bit argument fields ARG1 through ARG4 indicate the data bus width information BUS_IF, For instance. among the argument fields ARG1 through ARG4, the argument field ARG1 may include the data bus width information BUS_IF. A more detailed explanation will follow.

Figure 3B:
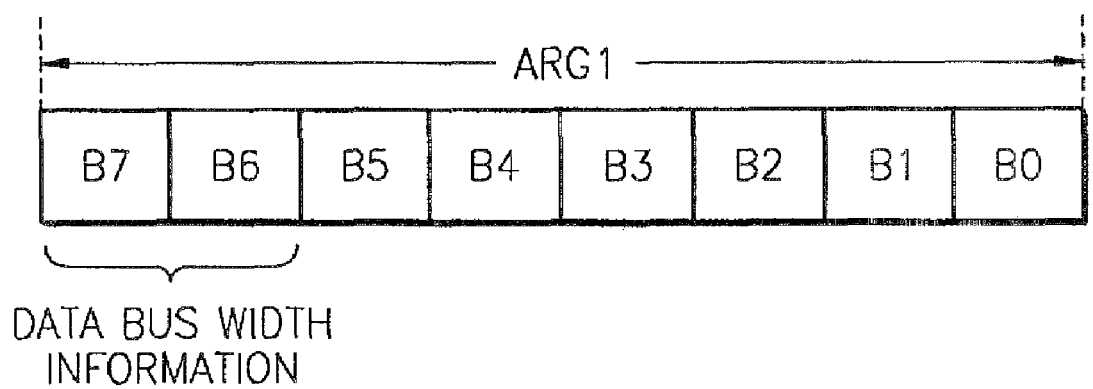
FIG. 3B is a schematic diagram illustrating an argument field shown in FIG. 3A in further detail.

The two most significant bits B7 and B6E among the bits B7 through B0 of the argument field ARG1 are assumed to indicate the data bus width information BUS_IF and the portable storage apparatus 200 is assumed to have the maximum eight bit data bus width. In a case where values of the two most significant bits B7 and B6 are "00," "01," "10," they can respectively indicate one bit, four bits, and eight bits data bus width. The number of predetermined bits representing the data bus width information BUS_IF, if necessary, can be increased or decreased. Although, the most significant bits B7 and B6 are shown to represent the data bus width information BUS_IF in FIG. 3B, some of the bits B5 through B0 may represent the data bus width information BUS_IF. In addition, the argument field ARG1 is shown to include the data bus width information BUS_IF in FIG. 3B, however, one of the argument fields ARG2 through ARG4 may include the data bus width information BUS_IF.

Furthermore, the maximum data bus width in the portable storage apparatus 200 can be increased or decreased if necessary, the data bus width information BUS_IF can indicate the data bus width in the various bits.

Referring back to FIG. 2, the control unit 240 is connected to the data buffer 260 via the data line 220. The data line 220 includes a plurality of data lines DL1 through DLN (N is a natural number more than 1).

The control unit 240 selects parts or all of the plurality of data lines DL1 through DLN and transmits or receives data via the selected data lines, in response to the data bus width information BUS_IF.

The control unit 240 stores data received from the host 100 in a flash memory 250 or reads the data requested by the host 100 from the flash memory 250.

The data buffer 260 is connected to the control unit 240 through the plurality of data pins DL1 through DLN. Also, the data buffer 260 is connected to the data register 270 connected to the plurality of data pins D1 through DN. The data buffer 260 receives read data from the control unit 240 through the selected data line and outputs the read data to the data register 270. The data register 270 transmits the read data to the host 100 through all or some of the plurality of data pins D1 through DN.

Moreover, the data register 270 receives write data from the host 100 through all or some of the plurality of data pins D1 through DN and outputs the write data to the data buffer 260. The data buffer 260 outputs the write data through the selected data line to the control unit 240.

Operations of setting the data bus width in the portable storage apparatus 200 having the above structure will be explained with reference to FIGS. 2 through 4. FIG. 4 is a flow chart illustrating an exemplary process of setting a data bus width in a portable storage apparatus shown in FIG. 2.

Referring to FIG. 4, the portable storage apparatus 200 is connected to the host 100 in step 1001. The host 100 transmits the data transmit command packet CMD_PK1 or the data request command packet CMD_PK2 including the data bus width information BUS_IF to the portable storage apparatus 200. The packet receiving unit 231 of the command packet decoder 230 in the portable storage apparatus 200 receives the data transmit command packet CMD_PK1 or the data request command packet CMD_PK2 through the command line 210 in step 1002. Thereafter, the packet receiving unit 231 divides the received data transmit command packet CMD_PK1 or the data request command packet CMD_PK2 into a command field CDM_FD and an argument field ARG_FD in step 1003.

The command field decoder 232 of the command packet decoder 230 outputs the write command WRITE or the read command READ by decoding the command field CMD_FD. The argument and bus information decoder 233 of the command packet decoder 230 outputs the data bus width information BUS_IF and the address information ADD by decoding the argument field ARG_FD in step 1004.

In response to the data bus width information BUS_IF, the control unit 240 of the portable storage apparatus 200 selects all or some of the plurality of data lines DL1 through DLN in step 1005. Then, the control unit 240 receives or transmits data through the selected data lines in step 1006. Finally, it is decided whether an additional data transmit or request command packet CMD_PK1 or CMD_PK2 is to be received in step 1007, and returns to step 1003 if there is one of these command packets in step 1008.

Figure 5:
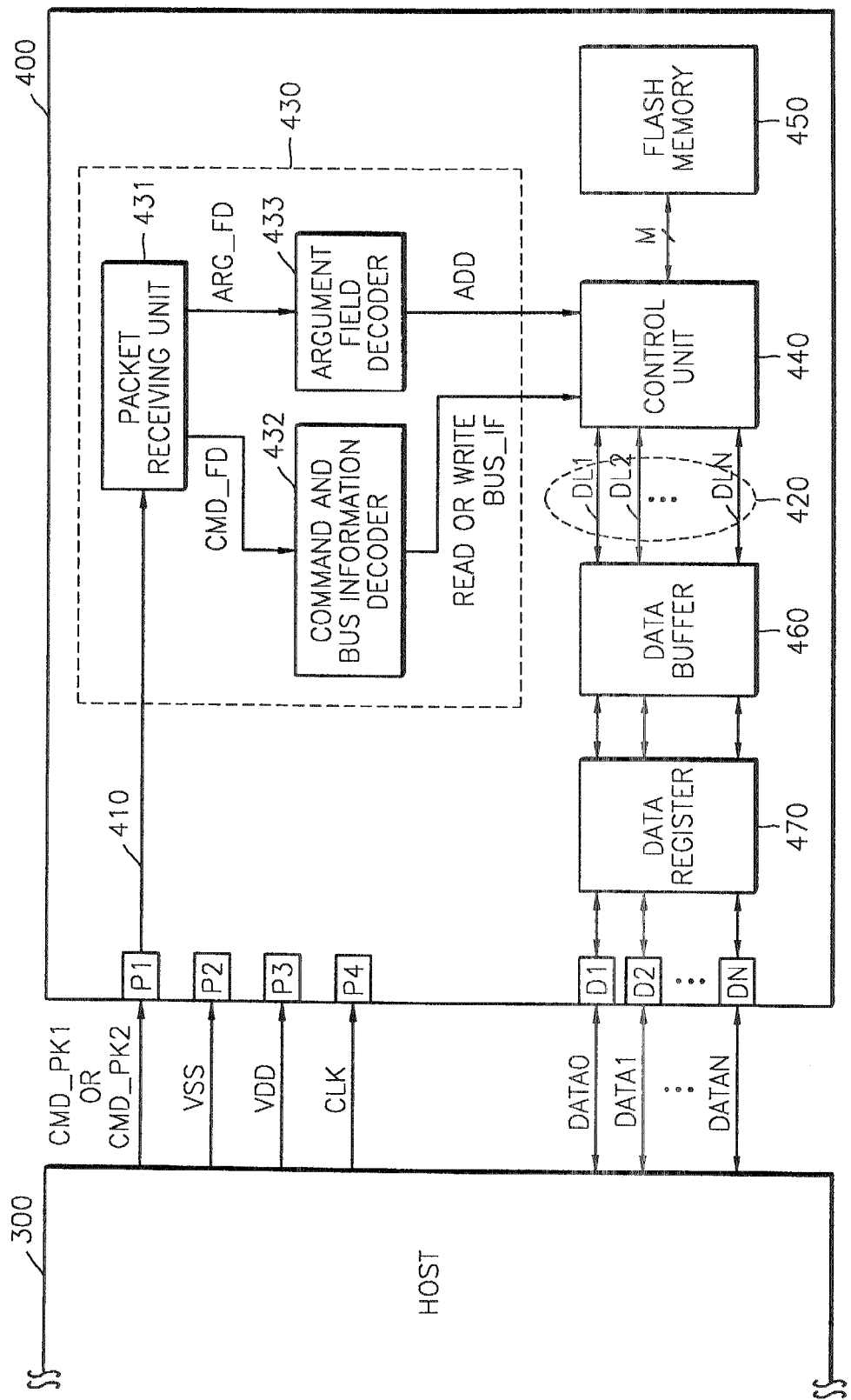
FIG. 5 is a block diagram illustrating a portable storage apparatus capable of freely changing a data bus width according to a second embodiment of the present disclosure.

FIG. 5 is a block diagram illustrating a portable storage apparatus capable of freely changing a data bus width according to a second embodiment of the present disclosure.

Referring to FIG. 5, a portable storage apparatus 400 is in signal communication with a host 300. The portable storage apparatus 400 includes a command line 410, a data line 420, a command packet decoder 430, a control unit 440, a flash memory 450, a data buffer 460, and a data register 470. Furthermore, the portable storage apparatus 400 further includes a command pin P1, electric power source pins P2 and P3, a clock pin P4, and a plurality of data pins D1 through DN (where N is a natural number greater than 1). The command line 410 is connected to the command pin P1.

The command packet decoder 430 includes a packet receiving unit 431, a command and bus information decoder 432, and an argument field decoder 433. The packet receiving unit 431 receives a data transmit command packet CMD_PK1 or a data request command packet CMD_PK2 from a host 300 through the command line 410, and divides the received packet into a command field CMD_FD and an argument field ARG_FD. The command and bus information decoder 432 outputs a read command READ or a write command WRITE and information on a data bus width BUS_IF by decoding the command field CMD_FD. The argument field decoder 433 outputs address information ADD by decoding the argument field ARG_FD.

Although it is not illustrated in FIG. 5, the command packet decoder 430 further receives various command packets other than the data transmit command packet CMD_PK1 and the data request command packet CMD_PK2 from the host 300. The command packet decoder 430 outputs command information by decoding the various received command packets.

Figure 6A:
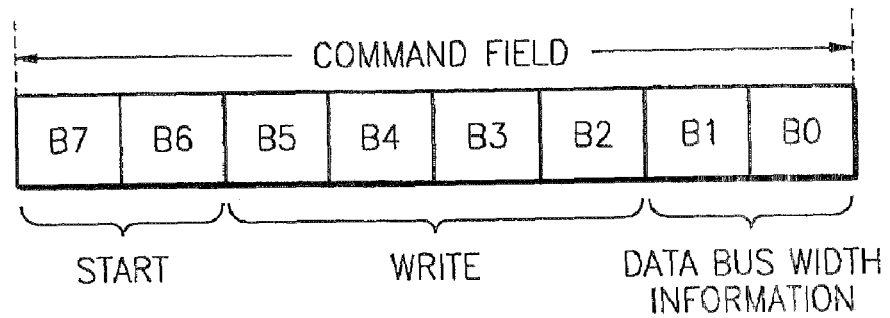
FIGS. 6A through 6C are schematic diagram examples of a command field included in a data transmit command packet and a data request command packet which a host shown in FIG. 5 sends to a portable storage apparatus.
Figure 6B:
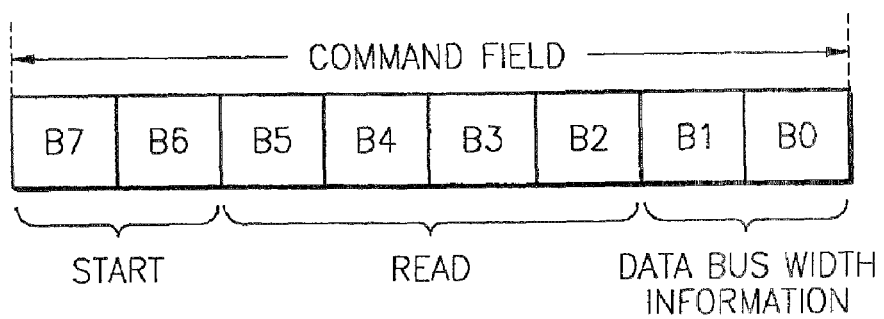
Figure 6C:
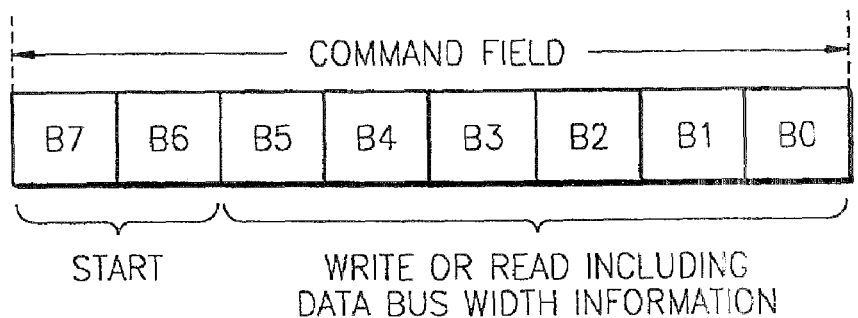

In the meantime, an example of the command field of the data transmit command packet CMD_PK1 and of the data request command packet CMD_PK2 which the host 300 transmits to the portable storage apparatus 400 is illustrated in FIGS. 6A through 6C.

FIG. 6A represents an example of the command field of the data transmit command packet CMD_PK1. The command field of the data transmit command packet CMO_PK1 includes predetermined bits as shown in FIG. 6A. The command field is illustrated to have 8 bits from B7 to B0. However, the number of bits of the command field can be increased or decreased, if necessary. Some of the bits of command field B7 through B0 indicate the data bus width information BUS_IF. That is, for example, the least significant bits B1 and B0 out of the bits B7 through B0 can indicate the data bus width information BUS_IF. Also, the bits B7 and B6 indicate start information START and the bits B5 through B2 indicate a write command WRITE.

The exemplary portable storage apparatus 400 is assumed to have a maximum eight bit data bus width. In this case, if the two least significant bits B1 and B0 are "00," "01," and "10," said values respectively indicate a one bit, four bit, and eight bit data bus width. The number of bits representing the data bus width information BUS_IF can be increased or decreased, if necessary.

Moreover, the maximum data bus width of the portable storage apparatus 400 can be increased or decreased, if necessary, and the data bus width information BUS_IF can indicate the data bus width in various bits.

FIG. 6B illustrates an example of the command field of the data request command packet CMD_PK2. Referring to FIG. 6B, the command field of the data request command packet CMD_PK2 includes predetermined bits. Composition of the command field shown in FIG. 6B is identical with that of the command field shown in FIG. 6A, and thus, a detailed explanation will be omitted. The only difference is that bits B5 through B2 of the command field shown in FIG. 6B represent a read command READ.

In addition, FIG. 6C illustrates another example of the command field. The command field includes predetermined bits and eight bits from 87 to B0 in FIG. 6C. The number of bits of the command field can be increased or decreased, if necessary. The bits B7 and B6 of the command field indicate the start information START, and the bits B5 through B0 indicate the write command WRITE or the read command READ including the data bus width information BUS_IF. A more detailed explanation will follow.

First, the portable storage apparatus 400 is assumed to have a maximum eight bit data bus width, and the bits B5 through B4 are assumed to indicate the write command WRITE if the bits have a value of '01'.

In this case, if the value of the bits B5 through B0 is '010001,' said value can indicate the write command WRITE and a one bit data bus width. In addition, if the value of the bits B5 through B0 is '010010,' said value can indicate the write command WRITE and a two bit data bus width. Also, if the value of the bits B5 through 80 is '011000', said value can indicate the write command WRITE and an eight bit data bus width. Thus, the write command WRITE or the read command READ and the data bus width can be expressed by using specific command codes.

In addition, the maximum data bus width in the portable storage apparatus 400 can be increased or decreased, if necessary, and the data bus width information can indicate the data bus width in various bits.

Referring back to FIG. 5, the control unit 440 is connected to the data buffer 460 through the data line 420. The data line 420 includes a plurality of data lines DL1 through DLN.

The control unit 440 selects all or some of the plurality of data lines DL1 through DLN, and transmits or receives the data through the selected data line, in response to the data bus width information BUS_IF.

The control unit 440 stores data received from the host 300 in a flash memory 450 or reads the data requested by the host 300 from the flash memory 450.

The data buffer 460 is connected to the control unit 440 through a plurality of data lines DL1 through DLN. In addition, the data buffer 460 is connected to the data register 470 and the data register 470 is connected to the plurality of data pins D1 through DN. The data buffer 460 receives read data from the control unit 440 through a selected data line and outputs the read data to the data register 470. The data register 470 transmits the read data to the host 300 through all or some of the plurality of data pins D1 through DN.

Moreover, the data register 470 receives write data from the host 300 through all or some of the plurality of data pins D1 through DN and outputs the write data to the data buffer 460. The data buffer 460 outputs the write data through the selected data line to the control unit 440.

Operations of setting the data bus width in the portable storage apparatus 400 having the above structure will be explained with reference to FIGS. 5 through 7. FIG. 7 is a flow chart illustrating a process of setting a data bus width in a portable storage apparatus shown in FIG. 5.

Referring to FIG. 7, the portable storage apparatus 400 is connected to the host 300 in a step 2001. The host 300 transmits the data transmit command packet CMO_PK1 or the data request command packet CMD_PK2 including the data bus width information BUS_IF to the portable storage apparatus 400. The packet receiving unit 431 of the command packet decoder 430 in the portable storage apparatus 400 receives the data transmit command packet CMD_PK1 or the data request command packet CMD_PK2 through the command line 410 in step 2002. Thereafter, the packet receiving unit 431 divides the data transmit command packet CMD_PK1 or the data request command packet CMO_PK2 received into a command field CMD_FD and an argument field ARG_FD in step 2003.

The command and bus information decoder 432 of the command packet decoder 430 outputs the write command WRITE or the read command READ and the data bus width information BUS_IF by decoding the command field CMD_FD in step 2004. The argument field decoder 433 of the command packet decoder 430 outputs the address information ADD by decoding the argument field ARG_FD.

The control unit 440 of the portable storage apparatus 400 selects all or some of the plurality of data lines DL1 through DLN in response to the data bus width information BUS_IF in step 2005. Then, the control unit 440 receives or transmits data through the selected data lines in step 2006. Finally, it is decided whether an additional data transmit or request command packet CMD_PK1 or CMD_PK2 is to be received in step 2007 and receives the additional data transmit command packet CMD_PK1 or the data request command packet CMD_PK2, and two process returns to the step 2003 if one of the command packets exists in step 2008.

Accordingly, the portable storage apparatus according to the present disclosure does not require a process of setting the data bus width in advance, since the data bus width information is received from the host when data is received or transmitted. In addition, the data bus width can be adjusted freely in the portable storage apparatus according to the present disclosure, because the data bus width is not required to be set in advance.

While the present invention has been particularly shown and described with reference to exemplary embodiments thereof, it will be understood by those of ordinary skill in the pertinent art that various changes in form and details may be made therein without departing from the spirit and scope of the present invention as defined by the following claims.

What is claimed is:

1. In a system including a host and multiple cards containing at least one non-volatile memory, a method of setting a data bus width in the system, the method comprising:
   connecting the multiple cards to the host;
   communicating a command packet between the host and at least one of the multiple cards, the command packet comprising at least one of a data transmit command and a data request command and including a data bus width information determining the number of data lines required to perform the data transmit or data request; and
   selecting at least one of a plurality of data lines in response to the data bus width information, and passing data through the selected at least one data line.

2. The method of claim 1, wherein the communicating step includes dividing the command packet into a command field and an argument field.

3. The method of claim 2, wherein the communicating step includes outputting the data bus width information by decoding the command field.

4. The method of claim 3, wherein the communicating step includes dividing the command packet into the command field and the argument field, if additional data transmit command packet or data request command packet is received.

5. The method of claim 2, wherein the communicating step includes outputting the data bus width information by decoding the argument field.

6. The method of claim 5, wherein the communicating step includes dividing the command packet into the command field and the argument field if additional data transmit command packet or data request command packet is received.

7. The method of claim 1, wherein the multiple cards comprise a MMC (MultiMedia Card), a SD (SecureDigital) memory card and a CF (CompactFlash) card.

8. In a system including a host and a storage device containing at least one non-volatile memory, a method of setting a data bus width in the system, the method comprising:
   connecting the storage device to the host;
   communicating a command packet between the host and the storage device, the command packet comprising at least one of a data transmit command and a data request command and including a data bus width information determining the number of data lines required to perform the data transmit or data request; and
   selecting at least one of a plurality of data lines in response to the data bus width information, and passing data through the selected at least one data line.

9. The method of claim 8, wherein the communicating step includes dividing the command packet into a command field and an argument field.

10. The method of claim 9, wherein the communicating step includes outputting the data bus width information by decoding the command field.

11. The method of claim 10, wherein the communicating step includes dividing the command packet into the command field and the argument field if additional data transmit command packet or data request command packet is received.

12. The method of claim 9, wherein the communicating step includes outputting the data bus width information by decoding the argument field.

13. The method of claim 12, wherein the communicating step includes dividing the command packet into the command field and the argument field if additional data transmit command packet or data request command packet is received.

14. The method of claim 8, wherein the storage device comprises a PDA (Personal Digital Assistance) or an MP3 (MPEG-1 Layer3).

15. A method of setting a data bus width in storage apparatus including at least one of a command line and a plurality of data lines forming a multi-line data bus, the method comprising:
   connecting the storage apparatus to a host;
   communicating a command packet between the host and the storage device, the command packet comprising at least one of a data transmit command and a data request command and including a data bus width information determining the number of data lines required to perform the data transmit or data request; and
   selecting at least one of the plurality of data lines in response to the data bus width information, and passing data through the selected at least one data line.

* * * * *